US005474577A

United States Patent [19]

Stoner, Sr. et al.

[11] Patent Number: 5,474,577

[45] Date of Patent: Dec. 12, 1995

[54] METHODS AND COMPOSITIONS FOR TREATING DENIM FABRIC AND THE FABRIC PRODUCED THEREBY

[75] Inventors: Paul Stoner, Sr.; Paul Stoner, Jr., both of Ossett; Thomas Pickard, Southport, all of England; Peter Margolin, Lincolnwood; Leon Leibovich, Highland Park, both of Ill.

[73] Assignee: Central Trading Enterprises, Inc., Northbrook, Ill.

[21] Appl. No.: 379,129

[22] Filed: Jan. 27, 1995

Related U.S. Application Data

[63] Continuation of Ser. No. 73,435, Jun. 9, 1993, abandoned.

[51] Int. Cl.[6] .............................. C09B 67/00; D06P 7/00

[52] U.S. Cl. .......................... 8/401; 8/478; 8/480; 8/483; 8/542; 8/918; 8/930; 8/114.6

[58] Field of Search .............................. 8/401, 445–466, 8/478–487, 542, 918, 930, 114.6; 435/209, 263

[56] References Cited

U.S. PATENT DOCUMENTS

| | | | |
|---|---|---|---|
| 917,298 | 4/1909 | Hübner . | |
| 1,655,973 | 1/1928 | Ross . | |
| 3,775,046 | 11/1973 | Harper, Jr. et al. | 8/449 X |
| 3,960,477 | 6/1976 | Harper, Jr. et al. | 8/15 |
| 3,986,824 | 10/1976 | Waibel et al. | 8/14 |
| 3,990,839 | 11/1976 | von der Eltz et al. | 8/14 |
| 4,000,964 | 1/1977 | Newton | 8/14 |
| 4,187,592 | 2/1980 | Bissi | 28/163 |
| 4,397,650 | 8/1983 | Gregorian et al. | 8/477 |
| 4,588,409 | 5/1986 | Sercus | 8/403 |
| 4,832,864 | 5/1989 | Olson | 252/174.12 |
| 4,881,941 | 11/1989 | Dixon | 8/482 |
| 4,912,056 | 3/1990 | Olson | 435/263 |
| 5,006,126 | 4/1991 | Olson et al. | 8/401 |
| 5,019,131 | 5/1991 | Nitsch, Jr. | 8/457 |
| 5,030,242 | 7/1991 | Bellaire | 8/483 X |
| 5,122,159 | 6/1992 | Olson et al. | 8/401 |
| 5,199,957 | 4/1993 | Pascoe | 8/478 |

FOREIGN PATENT DOCUMENTS

| | | | |
|---|---|---|---|
| 3161580 | 7/1991 | Japan . | |
| 3234880 | 10/1991 | Japan | D06P 1/34 |
| 3241077 | 10/1991 | Japan | D06P 3/85 |

*Primary Examiner*—Margaret Einsmann
*Attorney, Agent, or Firm*—Roylance, Abrams, Berdo & Goodman

[57] ABSTRACT

A method of treating blue or black denim fabric to change its color, a composition used to create the color change, and the denim fabric produced thereby. The composition is applied to the denim fabric in a washing machine and comprises cellulase enzyme, a detergent, a salt, a buffer and dyestuffs. The fabric is either stonewashed before or during application of the composition. After the composition is applied, the resulting denim fabric is stonewashed in appearance and has a surface displaying two sets of light and dark areas of different shades of the same color.

16 Claims, 1 Drawing Sheet

METHODS AND COMPOSITIONS FOR TREATING DENIM FABRIC AND THE FABRIC PRODUCED THEREBY

This is a continuation of application Ser. No. 08/073,435 filed Jun. 9, 1993 now abandoned.

FIELD OF THE INVENTION

The invention relates to methods and compositions for treating denim fabric and to the fabric produced thereby. The methods include treating blue or black denim fabric, in plain fabric form or in garment form, with cellulase enzyme and dyestuff to vary the color of the fabric. The resulting fabric has a stonewashed appearance and the surface displays areas of light and dark shades of the same color.

BACKGROUND OF THE INVENTION

Denim fabric, either blue or black in color, is the basic material used to make jeans. Typically, blue denim is indigo dyed denim. As the denim fabric ages and is washed, it becomes softer and the color fades, with white areas becoming visible in the fabric. This texture and appearance is popular with consumers, and manufacturers of jeans have developed techniques to provide that texture and appearance to new Jeans. In one instance, manufacturers literally wash the Jeans in a washing machine with stones, such as pumice stones, to produce a stonewashed look. In another instance, manufacturers wash the jeans with cellulase enzyme, which also produces a stonewashed look. In that case, the enzyme acts on the cellulose in the jeans, releasing color, which produces light or white areas and lightens the blue or black color similar to stonewashing. Use of cellulase enzyme to stonewash Jeans is disclosed in U.S. Pat. Nos. 4,832,864 and 4,912,056 to Olson, and U.S. Pat. Nos. 5,006,126 and 5,122,159 to Olson et al, the entire disclosures of which are hereby incorporated herein by reference.

While stonewashed jeans are desirable, they cannot be economically made in a large array of colors. If denim is first dyed a specific color, other than blue or black, and then stonewashed, the process is very expensive due to the multiple steps and inventories of dyes and fabrics. If blue or black denim is first stonewashed and then merely dyed, the process is again very expensive due to multiple steps and inventories, and also, there is little contrast between the previously formed white areas and the rest of the fabric due to the effect of the dye, resulting in a dull appearance. Special expensive equipment is also necessary in these dying processes.

Thus, there is a continuing need to provide an improved denim fabric for use in making Jeans of varied colors.

SUMMARY OF THE INVENTION

Accordingly, it is a primary object of the invention to provide a method of treating denim fabric in plain fabric form or in garment form to economically produce stonewashed denim fabric of various different shades and colors without multiple steps, expensive equipment, or large inventories of fabrics and dyes.

Another object of the invention is to economically provide stonewashed denim fabric of different shades and colors.

Another object of the invention is to use inventories of only blue or black denim fabric to produce stonewashed denim fabric of different colors, with each fabric comprising two shades of the same color.

The foregoing objects are basically attained by providing a method of treating blue or black denim fabric to produce a stonewashed denim fabric of a different color, comprising the steps of: contacting blue or black denim fabric with pumice stone, cellulase enzyme, or both, to produce stonewashed blue or black denim fabric, contacting the stonewashed blue or black denim fabric with an aqueous composition comprising water, cellulase enzyme, a detergent, a salt, a buffer, and dyestuff, and subjecting the stonewashed blue or black denim fabric and aqueous composition to mechanical action for a sufficient time for the cellulase enzyme to remove some of the blue or black color from the denim fabric, and for the dyestuff to modify the overall color of the fabric.

The foregoing objects are also basically attained by providing a composition for treating blue or black denim fabric to modify the color of the fabric, the combination comprising: cellulase enzyme; a detergent; a salt; a buffer; and dyestuff.

The foregoing objects are also basically attained by providing a denim fabric having different shades of color X on one surface, the combination comprising: a continuous piece of denim fabric having on one surface a first set of areas of color A and a second set of areas of color B, wherein color A is darker in color than white but lighter in color than the combination of color X and blue or black, wherein color B is a combination of color X and blue or black, wherein color X is not white, and wherein the color contrast between the first set of areas of color A and the second set of areas of color B is greater than the color contrast would be had the denim fabric been stonewashed and then dyed with color X, or dyed with color X and then stonewashed.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 1 is a diagrammatic top plan view of a piece of regular blue denim fabric in accordance with the prior art comprised of areas colored blue;

FIG. 2 is a diagrammatic top plan view of the piece of blue denim fabric shown in FIG. 1 which has been stonewashed and now has a first set of white areas and a second set of blue areas, in accordance with the prior art; and FIG. 3 is a diagrammatic top plan view of the piece of denim fabric shown in FIG. 2 which has been treated in accordance with the present invention and now has, as an example, a first set of light grey areas and a second set of grey-blue areas.

DETAILED DESCRIPTION OF THE INVENTION

Figure 1:
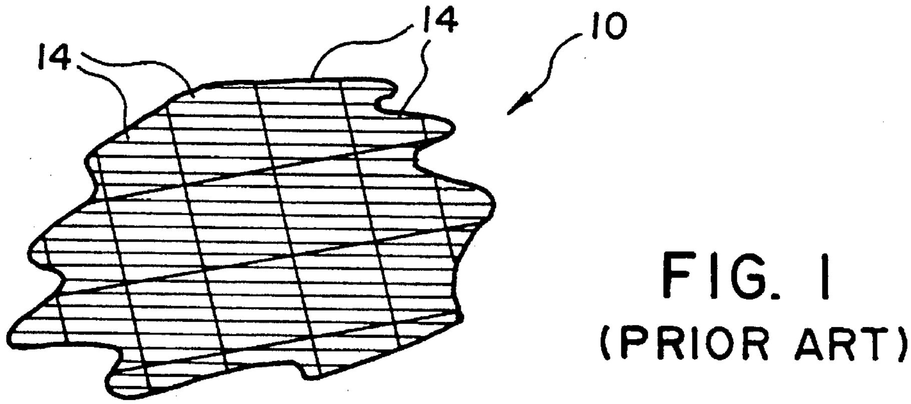
FIG. 1 (PRIOR ART)
Figure 2:
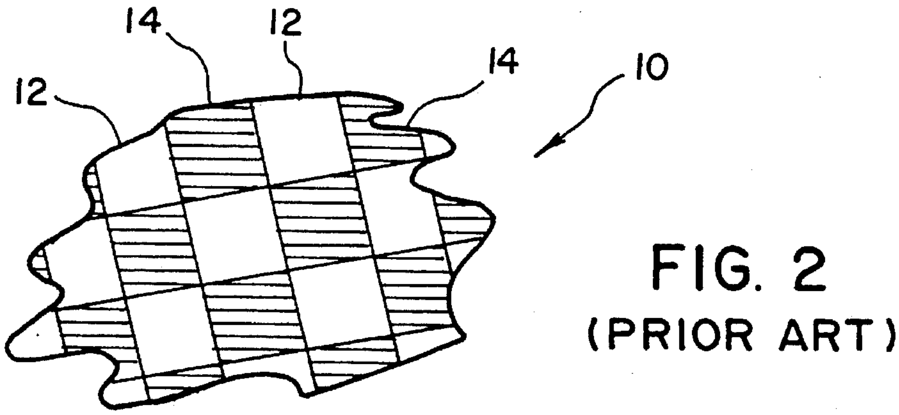
FIG. 2 (PRIOR ART)
Figure 3:
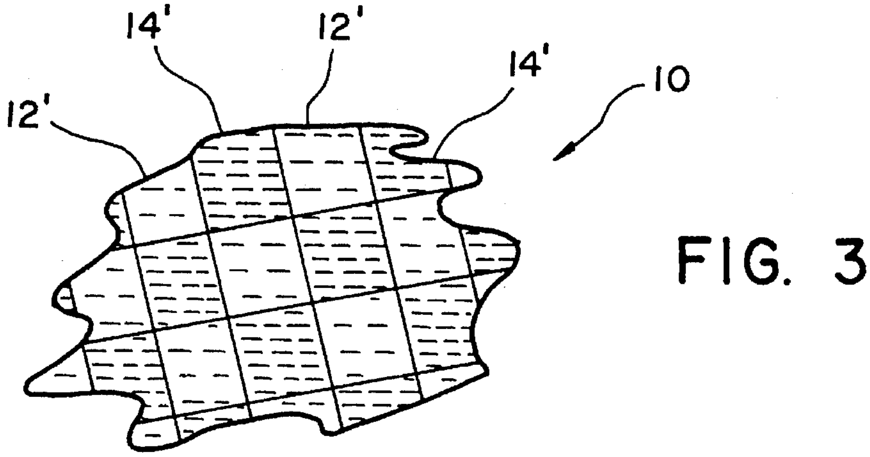

As seen in FIGS. 1–3, the present invention is intended to begin with a continuous piece of standard blue or black denim fabric 10, then stonewash the fabric 10 to obtain first areas 12 of white color and second areas 14 of lighter blue or black color, and treat the fabric 10 to produce a first set of light colored areas 12' of color A and a second set of darker colored areas 14' of color B in which the first and second sets of areas are derived from the same color X and are different shades thereof. Thus, the first set of areas 12' of color A are darker in color than white but lighter in color than the combination of the desired color X and blue or black, and the second set of areas 14' of color B is a combination of color X and blue or black, where color X is not white. Moreover, the color contrast between the first set of areas of color A and the second set of areas of color B is greater than the color contrast would be had the denim fabric, either white, or blue or black, been stonewashed and then dyed with color X, or dyed with color X and then stonewashed.

This desired denim fabric is produced by contacting the blue or black denim fabric with an aqueous composition of cellulase enzyme, a detergent, a salt, a buffer, and dyestuff, the dyestuff providing the desired color X, and by either stonewashing the fabric before or during contact with the aqueous composition.

The term "stonewash" used herein means that the fabric is contacted by stones, any other suitable abrasive materials, cellulase enzyme, or a combination of stones, suitable abrasive materials, and cellulase enzyme.

Advantageously, the composition of the present invention comprises, by weight per kilogram, about 5% to about 50% and preferably about 30% of cellulase enzyme, about 0% to about 30% and preferably about 10% of the detergent, about 0% to about 60% and preferably about 9% of the salt, about 10% to about 50% and preferably about 35% of the buffer, about 0.5% to about 25% and preferably about 15% of the dyestuff, and about 0% to about 1% and preferably about 1% of water. The dyestuff can vary, based on the desired color, and can be formed by the combination of various dyestuff colors.

The desired color X can be any color other than white, such as yellow, blue, red, purple, green, violet, grey, or any mixture of these colors, such as color X' plus color X".

Regarding the treatment activities of the aqueous composition, the cellulase enzyme lightens the fabric and removes parts of the dye from the blue or black denim. Advantageously, cellulase enzyme made and sold by Novo Nordisk of Copenhagen, Denmark, can be used, as can the cellulase enzymes disclosed in U.S. Pat. Nos. 4,832,864 and 4,912,056 to Olson and U.S. Pat. Nos. 5,006,126 and 5,122,159 to Olson et al. The cellulase enzymes are preferably neutral or acidic.

The detergent is preferably nonionic and is used to keep the blue or black dye that is removed from the denim fabric in suspension and out of the fabric. Instead of detergents, surfactants can be used. It also adds contrast between the first and second areas of colors A and B, as well as makes the new dyestuff more fluorescent. Typical detergents are: nonylphenol ethoxylates or alcohol ethoxylate, generally called nonionic detergents.

The salt or electrolyte is anionic or cationic and is used to exhaust the new color of dyestuff in the product onto the blue or black dye in the denim. Advantageously, it can be sodium chloride or sodium sulphate.

The buffer is used to keep the constituents of the bath from interacting and to maintain the desired pH of the aqueous bath, and advantageously can be sodium citrate and citric, or monosodium phosphates. Advantageous pH is about 6.5 to about 8.

The dyestuff is used to impart the new color X to the denim fabric, and advantageously can be any conventional dyestuff used to color denim fabric, which is compatible with cellulase enzyme and exhausts its color at relatively low temperatures, e.g., below boiling. The dyestuff can be direct dyes, pigment or reactive dyes manufactured by Ceiba-Geigy, Sandoz, BASF or ICI for example. Direct dyes usually require a pH of about 6–8 when using citrate and citric or phosphate to buffer the solution; reactive dyes usually require a pH of about 8–9 when using sodium carbonate as a buffer; and pigment dyes usually require a pH of about 6–7 when using citrate and citric or phosphate as a buffer.

METHOD OF TREATING THE DENIM FABRIC

In general, the method of the present invention for treating the blue or black denim fabric comprises stonewashing the denim fabric in a washing machine bath and treating the fabric with the aqueous composition including the cellulase enzyme, detergent, salt, buffer, and dyestuff of color X.

Generally, first the fabric, in plain fabric form or in garment form, is prepared to remove excess size to make the fabric more susceptible to the present invention. Advantageously, the fabric can be de-sized with alpha amylase enzyme.

The aqueous composition, in accordance with the present invention, preferably comprises a neutral cellulase enzyme, a nonionic detergent, an anionic salt, a buffer, and dyestuffs. This composition can be applied to the fabric mixed together or individually.

The fabric can be treated with the composition in either of two ways. First, the fabric can be treated while it is also treated to a stonewash. Second, the fabric can be treated to a stonewash procedure, and then to the composition.

The precise percentage of the composition used will depend on three things. First, it will depend on the customer requirements regarding how dark or light the fabric should be and the shades of colors. Second, it will depend on the type of machinery used for the process, and third, it will depend on the fabric.

Various percentages that are believed to be advantageous are about 0.25% up to about 8% based on the weight of the fabrics to be treated. For example, for 100 garments that weigh about 1½ pounds each, about 2–8 and preferably 4 pounds of composition will be used. However, this depends on the look that is requested and the strength of the enzymes and dyestuffs used. For example, the dyestuffs can be in the 200% and 250% range. When more enzyme is used, there is more abrasion of the fabric, and therefore, more highlights and contrast. As another example, 70 pounds of dry fabric can be used with 70 gallons of water and 2.75 pounds of composition in a 275 pound-classified washer extractor.

The cycle times used can be between about 12–80 minutes, and advantageously between about 25–45 minutes. Preferably, the machinery used to provide mechanical action is an industrial laundry machine.

During the process, it may be necessary to add additional salts to assist with better exhaustion of the dyes. Examples of these salts are as follows: sodium chloride, sodium sulphate, and ammonium sulphate.

Also, optional brighteners can be added to the bath to create a more fluorescent appearance. Examples of such optical brighteners are products derived from diamino stilbene disulphonic acid or distyryl benzene. These brighteners can be added in the same bath or in a new bath.

Advantageously, the temperature of the bath should be between about 120°–155° F., and most advantageously 140° F.

In various stages, pretreat and binders can be applied to improve the washfastness of the fabric. The binders tend to bind the dye to the fabric, and examples are as follows: quaternised polyethylene imines, and polyacrylamides as salts or quaternised. Preferably, these binders are acrylic and cationic.

Following on from the bath, the fabric is cleaned by using detergents such as Temple WBU and nonionic or anionic surfactants and blends with soap phosphates or silicates, and plain water rinses to remove any loose color that is on the fabric. This procedure improves the washfastness of the fabric and also increases color contrast.

The process can be run with or without the addition of pumice stones or any other abrasive materials.

Softeners can be added to these procedures, such as dialkyl dimethyl quaternary compounds, imidazolines, and alkyl amido salts and silicone softeners.

As an overall example of treating the blue or black denim fabric, the fabric is first placed in a water bath in an industrial washing machine with enzymes and stones to perform the standard stonewash of the fabric. Once the cycle is finished, the water is removed, the stones are left in, and the fabric can also be subjected to a rinse cycle. Then, the composition in accordance with the present invention is added, plus water, and the fabric is washed and mechanically agitated by the machine for between 12–80 minutes. Then, the fabric is rinsed with water and the stones are advantageously removed. The fabric can then be cleaned, exposed to a brightener, subjected to a final water rinse, and then dried in a dryer.

While advantageous embodiments have been chosen to illustrate the invention, it will be understood by those skilled in the art that various changes and modifications can be made therein without departing from the scope of the invention as defined in the appended claims. For example, the claims utilize the word "fabric" which is meant to be generic to denim fabric in plain fabric form and in garment form.

What is claimed is:

1. A method of dyeing blue or black denim fabric to produce a stonewashed denim fabric, comprising the steps of:

washing blue or black denim fabric with pumice stone, cellulase enzyme, or both, to produce stonewashed blue or black denim fabric, and dyeing the stonewashed blue or black denim fabric in an aqueous bath comprising an aqueous composition, said aqueous composition comprising water, cellulase enzyme, a detergent, a salt, a buffer, and dyestuff, while subjecting the stonewashed blue or black denim fabric and aqueous bath to mechanical action for a sufficient time for the cellulase enzyme to remove some of the blue or black color from the denim fabric, and to exhaust the dyestuff and modify the fabric and the overall color of the fabric to produce a stonewashed denim having dark areas of a combination of said blue or black and said dyestuff, and light areas of said dyestuff.

2. The method according to claim 1, wherein said aqueous composition comprises about 30% by weight of cellulase enzyme;

about 10% by weight of the detergent;

about 9% by weight of the salt;

about 35% by weight of the buffer; and about 15% by weight of the dyestuff; and further comprises about 1% by weight of water.

3. The method according to claim 1, wherein said composition comprises about 0.5% to about 25% by weight of dyestuff.

4. A method of modifying the color of previously stonewashed denim fabric of a first blue or black color to produce stonewashed denim fabric of a second color, comprising the steps of:

preparing an aqueous composition, said aqueous composition comprising water, cellulase enzyme, a detergent, a salt, a buffer, and dyestuff, and adding said aqueous composition to a bath, and dyeing the stonewashed blue or black denim fabric in said bath, while subjecting the stonewashed blue or black denim fabric and bath to mechanical action for a sufficient time for the cellulase enzyme to remove some of the blue or black color from the denim fabric, and to exhaust the dyestuff and dye the fabric and modify the overall color of the fabric to produce a stonewashed denim fabric having dark areas of a combination of said blue or black and said dyestuff, and light areas of said dyestuff.

5. The method according to claim 4, wherein said bath further comprises pumice stone.

6. The method according to claim 4, wherein said aqueous composition comprises about 5% to about 50% cellulase enzyme;

up to about 30% detergent;

up to about 60% salt;

about 0.5% to about 25% dyestuff; and up to about 1% water, wherein said percentages are by weight.

7. The method of claim 6, wherein said bath comprises about 0.25% to about 8% of said aqueous composition.

8. A denim fabric having a stonewashed look produced by the method comprising the steps of:

washing blue or black denim fabric with pumice stone, cellulase enzyme, or both, to produce stonewashed blue or black denim fabric, and dyeing the stonewashed blue or black denim fabric in a bath to which has been added an aqueous composition, said aqueous composition comprising water, cellulase enzyme, a detergent, a salt, a buffer, and dyestuff, while subjecting the stonewashed blue or black denim fabric and bath to mechanical action for a sufficient time for the cellulase enzyme to remove some of the blue or black color from the denim fabric without removing said dyestuff, and to exhaust the dyestuff and dye the fabric and modify the overall color of the fabric to produce a stonewashed denim having dark areas of a combination of said blue or black and said dyestuff, and light areas of said dyestuff.

9. The denim fabric of claim 8 wherein said dyestuff is selected from the group consisting of purple, green, violet, grey, yellow, blue, and red dyestuffs.

10. The denim fabric according to claim 8, wherein said composition comprises about 30% by weight of cellulase enzyme;

about 10% by weight of the detergent;

about 9% by weight of the salt;

about 35% by weight of the buffer; and about 15% by weight of the dyestuff; and further comprises about 1% by weight of water.

11. The denim fabric according to claim 8, wherein said composition comprises about 0.5% to about 25% by weight of dyestuff.

12. The denim fabric according to claim 8, wherein said aqueous composition comprises by weight about 5% to about 50% of cellulase enzyme;

up to about 30% of detergent;

up to about 60% of salt;

about 10% to about 50% of buffer; and about 0.5% to about 25% of dyestuff.

13. A denim fabric having a stonewashed look produced by the method comprising the steps of:

dyeing blue or black denim fabric in a bath to which has been added an aqueous composition, said aqueous composition comprising water, cellulase enzyme, a detergent, a salt, a buffer, and dyestuff, and stones or other abrasive materials, while subjecting the blue or black denim fabric and bath to mechanical action for a sufficient time for the cellulase enzyme to remove some of the blue or black color from the denim fabric without removing said dyestuff, and to exhaust the dyestuff and dye the fabric and modify the overall color of the fabric to produce a stonewashed denim having dark areas of a combination of said blue or black and said dyestuff and light areas of said dyestuff.

14. The denim fabric of claim 13, wherein said bath further comprises pumice stone.

15. A method of dyeing blue or black denim fabric to produce stonewashed denim fabric, comprising the steps of:

modifying the color of blue or black denim fabric in a bath to which has been added an aqueous composition, said aqueous composition comprising a dyestuff, cellulase enzyme, a detergent, a salt and a buffer while subjecting the fabric and bath of said aqueous composition to mechanical action for a sufficient time for the cellulase to remove some of the blue or black color from the denim fabric substantially without removing said dyestuff, and to exhaust the dyestuff to produce a stonewashed denim fabric having dark areas of a combination of said blue or black and said dyestuff and light areas of said dyestuff, wherein said aqueous composition comprises by weight about 5% to about 50% of cellulase enzyme;

up to about 30% of detergent;

up to about 60% of salt;

about 10% to about 50% of buffer; and about 0.5% to about 25% of dyestuff.

16. The method of claim 15, wherein said bath comprises about 0.25% to about 8% of said aqueous composition.

* * * * *